United States Patent [19]

Morikawa

[11] Patent Number: 4,981,127
[45] Date of Patent: Jan. 1, 1991

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 386,988

[22] Filed: Jul. 28, 1989

[30] Foreign Application Priority Data

Jul. 29, 1988 [JP] Japan .................. 63-191124

[51] Int. Cl.$^5$ .................. F02M 51/00; F02B 75/02
[52] U.S. Cl. .................. 123/494; 123/65 BA
[58] Field of Search .................. 123/494, 65 BA

[56] References Cited

U.S. PATENT DOCUMENTS

| | | | |
|---|---|---|---|
| 3,680,305 | 8/1972 | Miller | 123/65 BA |
| 4,732,116 | 3/1988 | Tanahashi et al. | 123/65 BA |
| 4,736,725 | 4/1988 | Iwaki et al. | 123/494 |
| 4,773,375 | 9/1988 | Okino et al. | 123/494 |

Primary Examiner—Raymond A. Nelli
Attorney, Agent, or Firm—Martin A. Farber

[57] ABSTRACT

A two-cycle engine has a scavenge pump provided in an intake passage, and a fuel injector provided for injecting fuel directly into a cylinder of the engine with compressed assist air. The quantity of intake air supplied by the scavenge pump and the quantity of the assist air are calculated in accordance with engine operating conditions. The quantity of fuel injected by the fuel injector is calculated based on the calculated quantities of the intake air and the assist air.

7 Claims, 4 Drawing Sheets

FUEL INJECTION CONTROL SYSTEM FOR A TWO-CYCLE ENGINE

BACKGROUND OF THE INVENTION

The present invention relates to a system for controlling the injection of fuel for a two-cycle engine with a direct fuel injection system wherein fuel is injected together with compressed air in the form of an air-fuel mixture.

There are various methods for supplying fuel to the two-cycle engine. In a method where fuel is mixed with air to make a combustible mixture and the mixture is supplied to a cylinder of the engine, a part of the fuel escapes from the cylinder through an exhaust port upon the scavenging of the cylinder. In order to prevent fuel from escaping through the exhaust port, a method in which air alone is delivered to the cylinder and fuel is injected directly to the cylinder by an injector is proposed. Since the fuel injection occurs during the compression stroke, the fuel must be injected at a high pressure. Accordingly, there has been proposed a fuel injection system where fuel is injected together with compressed assist air.

Japanese Patent Application Laid-Open 60-501963 (International Publication No. WO 85/00854) discloses a fuel injection system where a predetermined amount of fuel is accumulated in a chamber formed in an injector and injected by compressed assist air having a pressure higher than a pressure in the combustion chamber.

However, the assist air inevitably enters the combustion chamber with the fuel. Since the quantity of fuel in a low engine speed range and a light load range is small, the ratio of the total quantity of the air to the fuel in the cylinder increases, thereby rendering the air-fuel mixture lean.

SUMMARY OF THE INVENTION

The object of the present invention is to provide a fuel injection control system for a two-cycle engine in which the quantity of injected fuel is accurately controlled.

According to the present invention, there is provided a system for controlling the quantity of fuel for a two-cycle engine having at least one cylinder, a scavenge port, an intake passage communicated with said scavenge port, a fuel injector provided for injecting the fuel directly in the cylinder with assist air compressed by a pump, and a scavenge pump provided in the intake passage for supplying intake air to the cylinder.

The system comprises an air-flow meter provided in the intake passage for detecting amount of intake air and for producing an intake air quantity signal, detector means for detecting engine operating conditions and for producing an operating condition signal, first calculator means responsive to the operating condition signal for calculating a quantity of the intake air supplied by the scavenge pump, second calculator means responsive to the operating condition signal for calculating a quantity of assist air and third calculator means for calculating a quantity of fuel injected by the fuel injector based on the quantity of the intake air and the quantity of assist air.

These and other objects and features of this invention will become understood from the following description with reference to the accompanying drawings.

DETAILED DESCRIPTION OF THE PREFERRED EMBODIMENT

Figure 1:
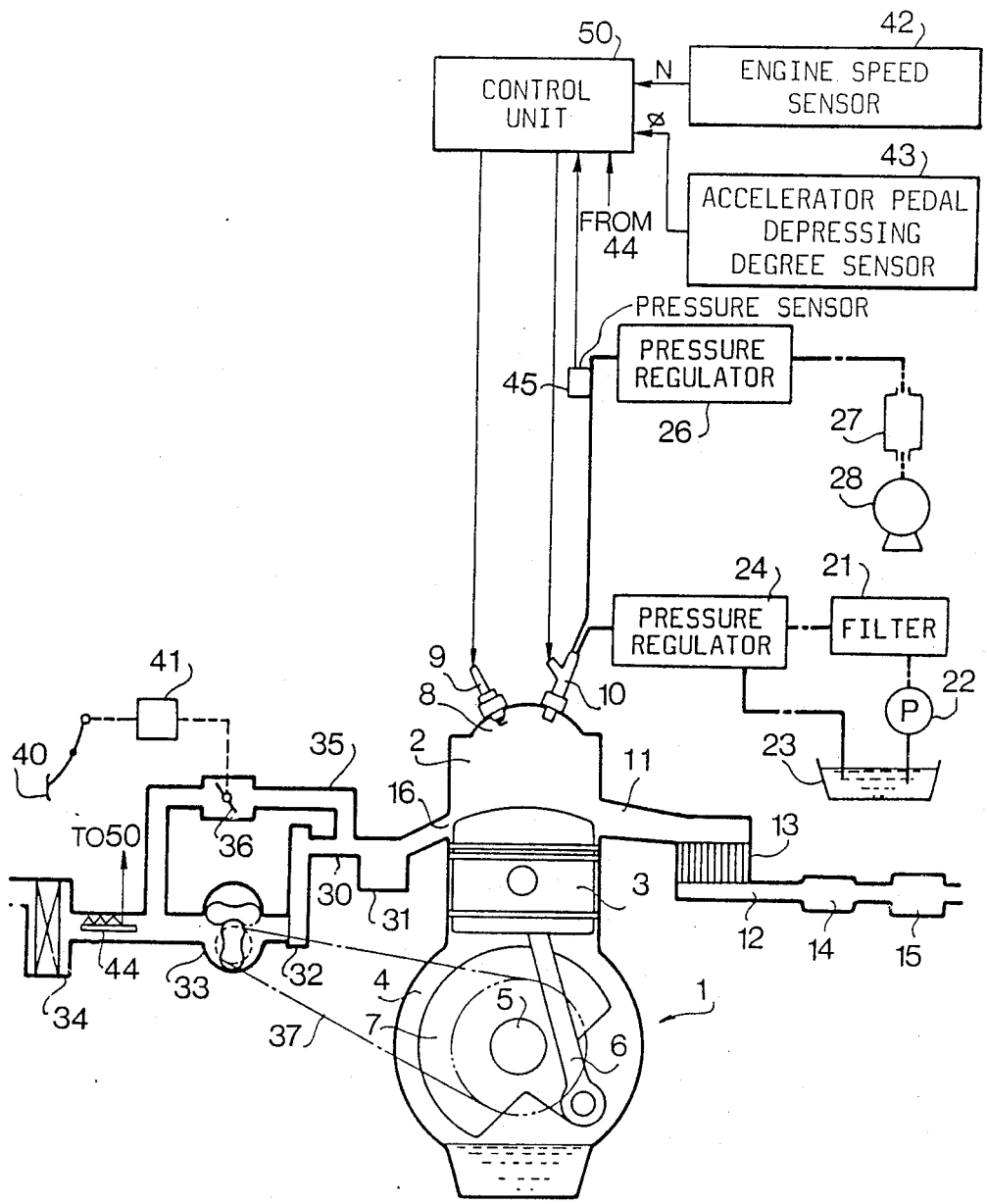
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed at 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with air by compressed air in the form of an air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with the air supplied to the injector 10 through a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air and an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas of the engine 1 is discharged through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions. An air-flow meter 44 is provided immediately downstream of the air cleaner 34 for detecting the quantity of intake air. In addition, a pressure sensor 45 is provided in the air passage 25 downstream of the pressure regulator 26 for detecting the pressure of the air to be injected.

Output signals from sensors 42, 43, 44 and 45 are supplied to a control unit 50 which feeds an ignition signal, an air injection pulse signal and a fuel injection pulse signal to the spark plug 9 and to the injector 10, respectively.

Figure 2:
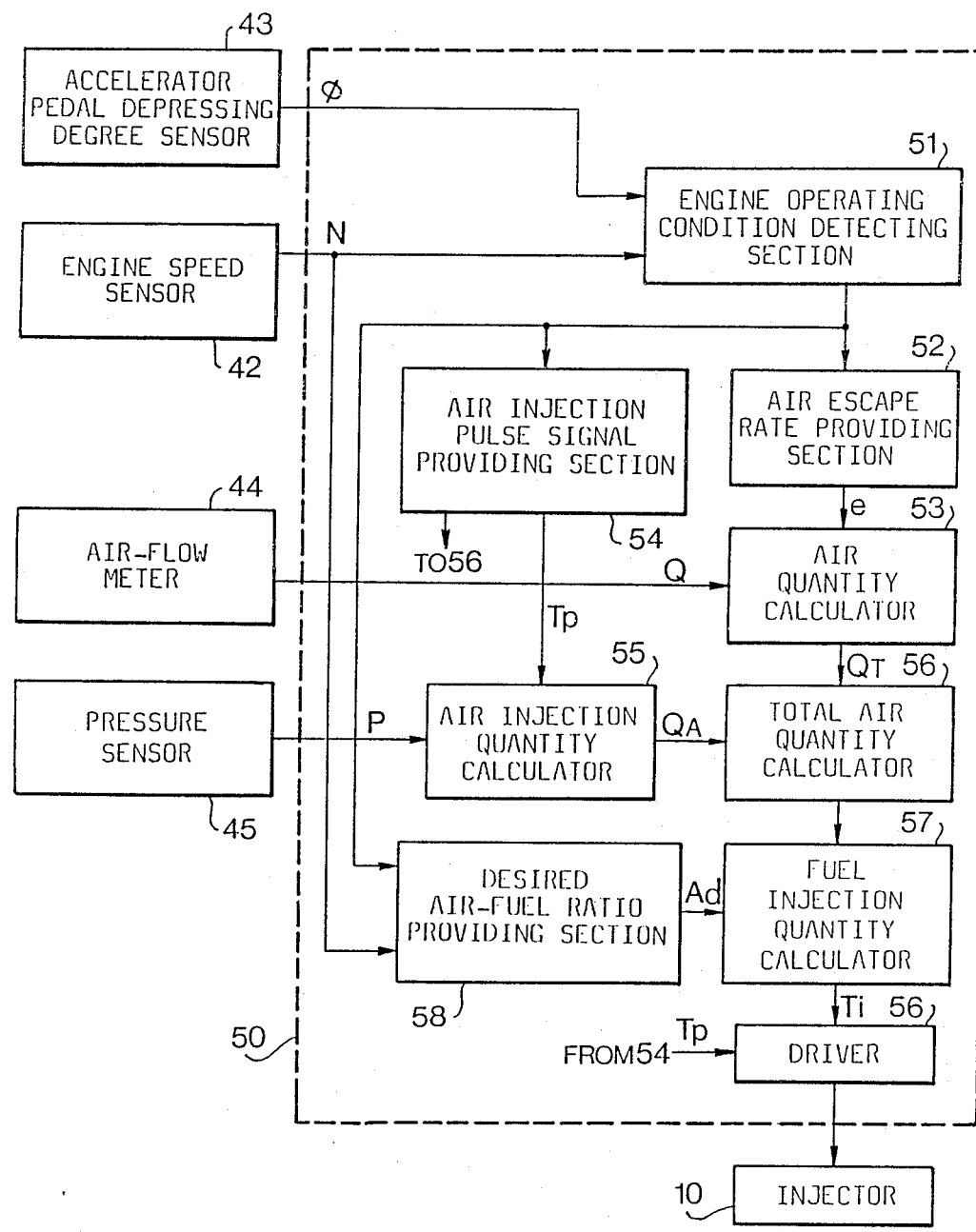
FIG. 2 is a block diagram showing a control unit according to the present invention.
Figure 3A:
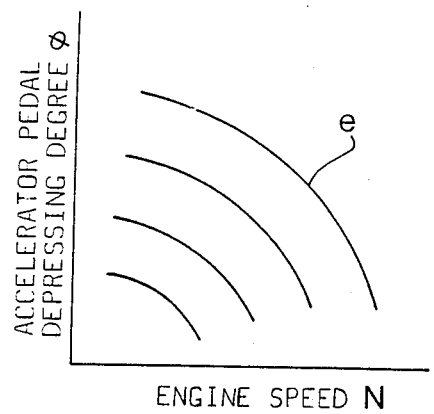
FIG. 3a is a table showing air escape rates with respect to accelerator pedal depressing degree and engine speed.

Referring to FIG. 2, the control unit 50 comprises an engine operating condition detecting section 51 to which signals representing engine speed N and accelerator pedal depressing degree $\phi$ are applied. In an escape rate providing section 52, the rate of escape air e during the scavenging is derived from an escape rate table in accordance with the engine operating condition detected in the detecting section 51, namely, engine speed N and accelerator pedal depressing degree $\phi$. The table stores a plurality of rates of escape air which are experimentally obtained, wherein each rate increases as an increasing function of accelerator pedal depressing degree $\phi$ as shown in FIG. 3a.

The escape rate e and the intake air quantity Q detected by the air-flow meter 44 are fed to an air quantity calculator 53 where the actual air quantity $Q_T$ in the cylinder 2 is calculated in dependency on $Q_T = e \times Q$.

The control unit 50 is further provided with an air injection section 54 where an assist air injection pulse width Tp and the output timings thereof are determined in accordance with the driving conditions. The assist air injection pulse width Tp and pressure P of the assist air detected by the pressure sensor 45 are applied to an assist air injection quantity calculator 55. A quantity $Q_A$ of assist air to be injected is calculated in dependency on $$Q_A = K \times Tp \times P,$$

where K is a coefficient. The assist air injection quantity $Q_A$ is fed to a total air quantity calculator 56 where the air quantity $Q_T$ is also fed, so as to add the air quantities $Q_A$ and $Q_T$ together to obtain a total air quantity $Q_O$.

Figure 3B:
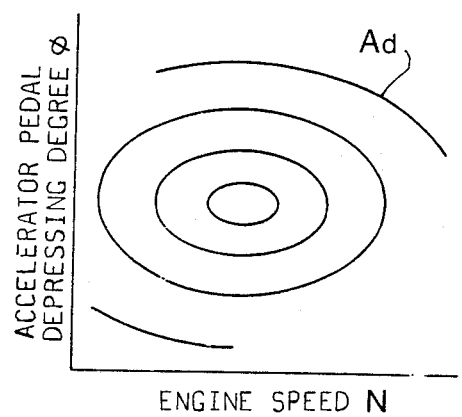
FIG. 3b is a table showing desired air-fuel ratios with respect to the accelerator pedal depressing degree and engine speed.

FIG. 3b shows a desired air-fuel ratio table in which a plurality of desired air-fuel ratios Ad are stored and arranged in accordance with engine speed N and accelerator pedal depressing degree $\phi$. A desired air-fuel ratio deriving section 58 is provided for deriving a desired air-fuel ratio Ad from the table in accordance with the engine speed N and accelerator pedal depressing degree $\phi$. The desired air-fuel ratio Ad is applied to a fuel injection pulse width calculator 57 to which the total air quantity $Q_O$ is also applied. In the fuel injection pulse width calculator 57, a fuel injection pulse width Ti is calculated from the equation $$Ti = f \times Q_O / Ad$$

where f is a coefficient corresponding to a desired air-fuel ratio. The fuel injection pulse width Ti and assist air injection pulse width Tp are fed to the injector 10 through a driver 59. Thus, accumulated fuel, the amount of which corresponds to the fuel injection pulse width Ti, is injected by the compressed assist air in accordance with the pulse width Tp.

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is largely opened. As a result, a large amount of air is returned to the inlet side of the scavenge pump 33. Thus, a small amount of air, which corresponds to the small accelerator pedal depressing degree $\phi$, flows into the cylinder 2 for scavenging without causing pumping loss. As the depressing degree $\phi$ increases, the quantity of fresh air forced into the cylinder 2 increases with closing of the control valve 36.

When the piston 3 reaches a position close to the bottom dead center as shown in FIG. 1, the scavenge port 16 opens as well as the exhaust port 11 so that intake air, the quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 50 is injected by the compressed air, which is supplied in accordance with the air pulse signal, as air-fuel mixture. The mixture swirls in the combustion chamber with the scavenging air and is ignited by the spark plug 9 immediately before the top dead center. During the expansion stroke, the piston 3 descends for the power stroke. Accordingly, the exhaust port 11 is opened so that burned gas in the cylinder 2 which is still under high pressure escapes. The piston 3 further descends, thereby returning to the afore-described intake stroke where cylinder 2 is scavenged.

Figure 4:
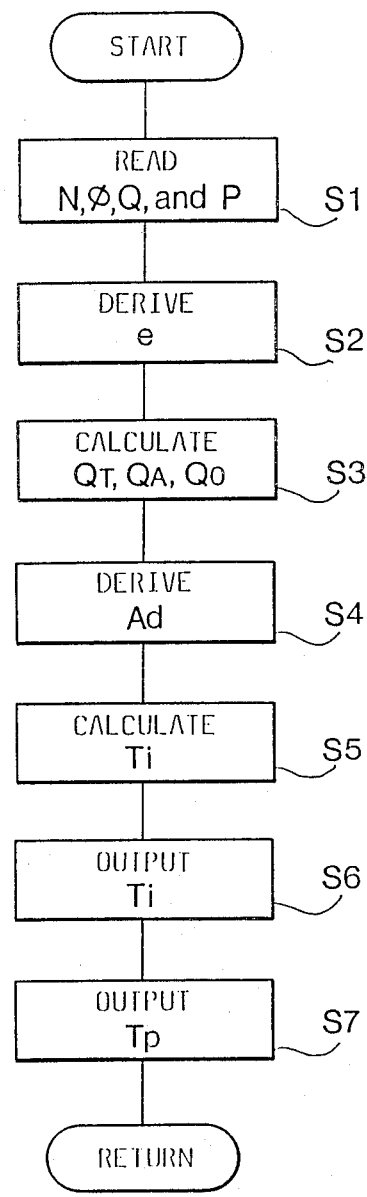
FIG. 4 is a flowchart showing an operation of the system.

Describing the operation of the system with reference to the flowchart of FIG. 4, the accelerator pedal depressing degree $\phi$, engine speed N and intake air quantity Q and pressure P of the compressed assist air are read from the sensors 43, 42, 44 and 45 at a step S1, and the air escape rate e is read out from the table in accordance with the driving conditions at a step S2. At a step S3, the quantity $Q_T$ of air in the cylinder is calculated based on the escape rate e and the intake air quantity Q. Furthermore, the assist air injection quantity $Q_A$ is calculated based on the assist air injection pulse width Tp and the pressure P. Accordingly, the total quantity $Q_O$ of air in the cylinder is accurately calculated.

At a step S4, a desired air-fuel ratio Ad is derived from the table and at a step S5, a fuel injection pulse width Ti is calculated based on the total air quantity $Q_O$ and the desired air-fuel ratio Ad. The amount of fuel corresponding to the pulse width Ti is accumulated in the injector 10 at a step S6, and injected at the pulse width Tp and timing determined in the air injection pulse signal providing section 54 (step S7).

Therefore, the quantity of the fuel from the fuel injector 10 is controlled in dependency on the engine driving conditions in accordance with the engine speed N and the accelerator pedal depressing degree $\phi$. Thus, the air-fuel ratio of the mixture in the combustion chamber becomes substantially constant The power of the engine is controlled by changing the quantity of the injected mixture having a constant air-fuel ratio in accordance with the load on the engine.

The pressure sensor may be omitted when the pressure of air applied to the injector 10 is constant.

In accordance with the present invention, the quantity of compressed assist air for injecting fuel is taken into account so as to accurately calculate the quantity of air in a cylinder. Consequently, the air-fuel ratio is precisely controlled, even in a low engine speed range and a light load range. Thus, fuel consumption, emission control and driveability are improved. Moreover, the amount of air escaping during scavenging is excluded from the total air quantity in order to control the air-fuel ratio more accurately.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for controlling a quantity of fuel for a two-cycle engine having at least one cylinder, a scavenge port opening through a wall of the cylinder, an intake passage communicating with the scavenge port, a scavenge pump in the intake passage for supplying intake air to the cylinder, an air-flow meter in the intake passage for detecting the quantity of the intake air passing through the scavenge pump and for producing a corresponding intake air quantity signal, and detecting means for detecting operating conditions and for producing a corresponding operating condition signal, the improvement in the system comprising:

a pump for compressing assist air to assist injection of the fuel into the cylinder;

an injector for injecting the fuel and assist air directly into the cylinder;

first calculator means operatively responsive to the operating condition signal for calculating a quantity of the assist air to be injected from the injector and producing a corresponding assist air quantity signal;

second calculator means responsive to the intake air quantity signal and the assist air quantity signal for calculating a total quantity of the air in the cylinder and for producing a corresponding total air quantity signal;

third calculator means responsive to the total air quantity signal for calculating a fuel injection quantity and for producing a corresponding fuel injection quantity signal; and driver means responsive to the fuel injection quantity signal for driving the injector for injecting the fuel corresponding to the fuel injection quantity, said driver means for injecting the assist air into the cylinder assisting the injecting of the fuel.

2. The system according to claim 1, wherein said first calculator means is further responsive to pressure of the assist air to be injected for calculating said quantity of assist air as a function of said pressure.

3. The system according to claim 1, further comprising air escape rate providing means responsive to the operating condition signal for determining a rate of escape air from the cylinder at a scavenging stroke of the engine and for producing a corresponding escape rate signal; and said second calculator means is further responsive to the escape rate signal for calculating said total quantity of the air induced in the cylinder by adding the quantity of the assist air to actual remaining air quantity in the cylinder representing the intake air quantity corrected by said rate of the escape.

4. The system according to claim 3, wherein
   the operating conditions are and the operating condition signal represents engine speed and accelerator pedal depressing degree, an accelerator pedal being operatively connected to a control valve in a bypass around the scavenge pump in the intake passage; and said air escape rate providing means determines the rate of the escape air based on the engine speed and the accelerator pedal depressing degree, said rate of the escape air being an increasing function of the engine speed and the accelerator pedal depressing degree.

5. The system according to claim 1, further comprising setting means responsive to the operating condition signal for setting a desired air-fuel ratio and for producing a corresponding desired ratio signal; and said third calculator means is further responsive to the desired ratio signal for calculating the fuel injection quantity so that the desired air-fuel ratio is achieved.

6. The system according to claim 5, wherein
   the operating conditions are and the operating condition signal represents engine speed and accelerator pedal depressing degree, an accelerator pedal being operatively connected to a control valve in a bypass around the scavenge pump in the intake passage; and said setting means sets the desired air-fuel ratio based on the engine speed and the accelerator pedal depressing degree.

7. The system according to claim 2, further comprising an air injection pulse signal providing means responsive to the operating condition signal for providing an air injection pulse width;

said first calculator means is responsive to the pressure of the assist air and said air injection pulse width for calculating said quantity of assist air as a function of said pressure and said air injection pulse width; and said driver means is further responsive to said air injection pulse width for injecting the assist air into the cylinder along with the fuel.

* * * * *